United States Patent [19]
Riddle et al.

[11] Patent Number: 6,148,317
[45] Date of Patent: Nov. 14, 2000

[54] METHOD AND APPARATUS FOR COMPRESSING SIGNALS IN A FIXED POINT FORMAT WITHOUT INTRODUCING A BIAS

[75] Inventors: Christopher C. Riddle; Jeffrey A. Levin, both of San Diego, Calif.

[73] Assignee: Qualcomm Incorporated, San Diego, Calif.

[21] Appl. No.: 09/134,248

[22] Filed: Aug. 14, 1998

[51] Int. Cl.[7] ........................................................ G06F 7/38
[52] U.S. Cl. ................................................................ 708/551
[58] Field of Search ........................................ 708/551, 497

[56] References Cited

U.S. PATENT DOCUMENTS

| | | | |
|---|---|---|---|
| 5,214,598 | 5/1993 | Hammerstrom | 708/551 |
| 5,329,475 | 7/1994 | Juri et al. | 708/551 |
| 5,424,967 | 6/1995 | Lee | 705/551 |
| 5,696,710 | 12/1997 | Hague et al. | 708/551 |

FOREIGN PATENT DOCUMENTS

9209032   5/1992   WIPO ................................ G06F 7/38

*Primary Examiner*—David H. Malzahn
*Attorney, Agent, or Firm*—Phillip R. Wadsworth; Gregory D. Ogrod

[57] ABSTRACT

A method and apparatus for compressing fixed point signals without introducing a bias. Signals are compressed according to a dithered rounding approach wherein signal values are rounded up and rounded down with approximately equal probability, canceling the bias that would otherwise result from the rounding operation. Numerical properties of the input signal are exploited in order to determine whether the signal value should be rounded up or down. Signal compression may, therefore, be introduced at multiple points within a system without accumulating a signal bias and degrading downstream performance. Further, one bit signal compression may be achieved in a particularly efficient fashion with a minimal amount of hardware.

5 Claims, 6 Drawing Sheets

| DECIMAL VALUE | BINARY VALUE | TRUNCATION | ERROR | ROUND | ERROR | DITHER ROUND | ERROR |
|---|---|---|---|---|---|---|---|
| 7 | 0111 | 011 | -0.5 | 011 | -0.5 | 011 | -0.5 |
| 6 | 0110 | 011 | 0.0 | 011 | 0.0 | 011 | 0.0 |
| 5 | 0101 | 010 | -0.5 | 011 | 0.5 | 011 | 0.5 |
| 4 | 0100 | 010 | 0.0 | 010 | 0.0 | 010 | 0.0 |
| 3 | 0011 | 001 | -0.5 | 010 | 0.5 | 001 | -0.5 |
| 2 | 0010 | 001 | 0.0 | 001 | 0.0 | 001 | 0.0 |
| 1 | 0001 | 000 | -0.5 | 001 | 0.5 | 001 | 0.5 |
| 0 | 0000 | 000 | 0.0 | 000 | 0.0 | 000 | 0.0 |
| -1 | 1111 | 111 | -0.5 | 000 | 0.5 | 111 | -0.5 |
| -2 | 1110 | 111 | 0.0 | 111 | 0.0 | 111 | 0.0 |
| -3 | 1101 | 110 | -0.5 | 111 | 0.5 | 111 | 0.5 |
| -4 | 1100 | 110 | 0.0 | 110 | 0.0 | 110 | 0.0 |
| -5 | 1011 | 101 | -0.5 | 110 | 0.5 | 101 | -0.5 |
| -6 | 1010 | 101 | 0.0 | 101 | 0.0 | 101 | 0.0 |
| -7 | 1001 | 100 | -0.5 | 101 | 0.5 | 101 | 0.5 |
| -8 | 1000 | 100 | 0.0 | 100 | 0.0 | 100 | 0.0 |
| AVERAGE ERROR | | | -0.250 | | 0.188 | | 0.00 |

METHOD AND APPARATUS FOR COMPRESSING SIGNALS IN A FIXED POINT FORMAT WITHOUT INTRODUCING A BIAS

BACKGROUND OF THE INVENTION

I. Field of the Invention

The present invention relates to signal compression. More particularly, the present invention relates to a novel and improved method and apparatus for compressing a fixed point signal without introducing a bias.

II. Description of the Related Art

Electronic digital systems often represent numbers internally according to two different formats: floating point and fixed point. Floating point notation has no fixed decimal point. Numbers are represented in floating point by two components: a mantissa and an exponent. Fixed point, on the other hand, is a format in which all numerical quantities are expressed by a predetermined number of digits, with the decimal point implicitly located at some predetermined position. Fixed point numbers are the subject of the current invention.

Systems designers endeavor to represent numbers with as few bits as possible. The expense and complexity of hardware depends, in part, on the number of bits: the more bits, the larger and more complex the hardware. Saving even a single bit translates into a direct reduction in hardware costs. Designers determine the system's dynamic range requirements and set the number of bits accordingly.

Different signals within a digital system may have different dynamic range requirements. For instance, multiplication of an M-bit number with and N-bit number results in a product having M+N bits for full precision. However, the system may not require that the product signal have that high a dynamic range. It may, therefore, be desirable to discard bits from the signal (i.e., compress the signal).

Two conventional approaches to signal compression are truncation and rounding. Truncation refers to simply dropping one or more of the least significant bits or digits in this case from a signal. Truncation, however, introduces a negative bias into the compressed signal because truncation always involves throwing away a positive quantity (the truncated bits). These biases accumulate as more truncation operations are performed. This accumulated bias can significantly degrade downstream performance, particularly in low signal level environments. Rounding performs better than truncation, but nevertheless introduces a bias that also can degrade downstream performance.

Thus, there exists a need for a method and apparatus designed to compress fixed point signals without introducing a bias.

SUMMARY OF THE INVENTION

The present invention is a novel and improved method and apparatus for compressing fixed point signals without introducing a bias. According to the invention, signals are compressed according to a dithered rounding approach wherein signal values are rounded up and rounded down with approximately equal probability, canceling the bias that would otherwise result from the rounding operation. The present invention exploits numerical properties of the input signal in order to determine whether the signal value should be rounded up or down.

An advantage provided by the current invention is that signal compression is achieved without the introduction of a bias. Signal compression may, therefore, be introduced at multiple points within a system without accumulating a signal bias and degrading downstream performance.

A feature of the present invention is that one bit signal compression in general may be achieved in a particularly efficient fashion with a minimal amount of hardware.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein.

DETAILED DESCRIPTION OF THE PREFERRED EMBODIMENTS

I. Overview and Discussion of the Invention

Figure 1:
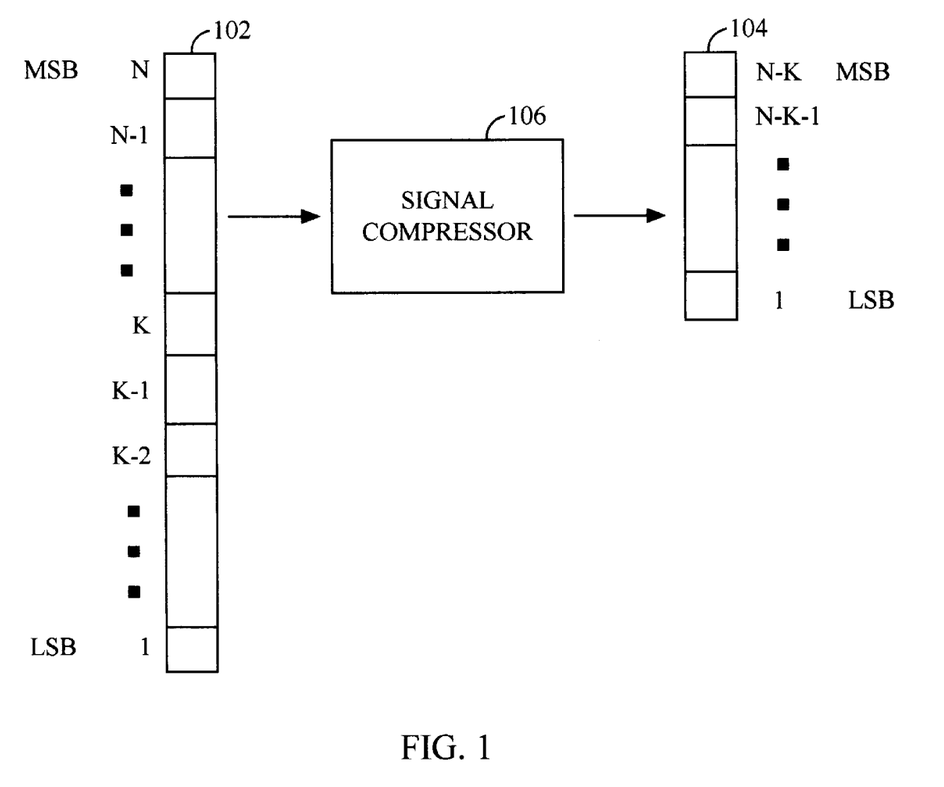
FIG. 1 is a diagram illustrating signal compression by K bits.

The present invention is directed toward a novel and improved method and apparatus for compressing fixed point signals without introducing a bias. FIG. 1 depicts a signal compressor 106 that compresses an N-bit input signal 102 to an N–K bit output signal 104 (K-bit compression). As is well known to those skilled in the art, signal compression in the present context refers to systematically reducing the number of bits used to represent a signal. As shown in FIG. 1, signal compressor 106 reduces the number of bits representing input signal 102 by K bits, thereby forming output signal 104.

As shown in FIG. 1, the bits of input signal 102 and output signal 104 will be referred to in order of increasing significance. For example, bit 1 refers to the least significant bit, bit K refers to the $K^{th}$ least significant bit, and bit N refers to the most significant bit of an N-bit number. Groups of bits are also referred to as, e.g., the N–K most significant bits (identifying bit N–K through bit N of an N-bit number) or the K least significant bits (identifying bit 1 through bit K of a number having at least K bits). Further, input signal 102 and output signal 104 will be referred to as having an integer component (the N–K most significant bits) and a fractional component (the K least significant bits).

Various embodiments of signal compressor 106 are described below. A signal compression method according to the present invention is first described with reference to FIGS. 2 and 3. Next, a K-bit signal compressor embodiment is described with reference to FIG. 4. A one bit signal compressor embodiment is then described with reference to FIG. 5.

II. Signal Compression Methods

Figure 2A:
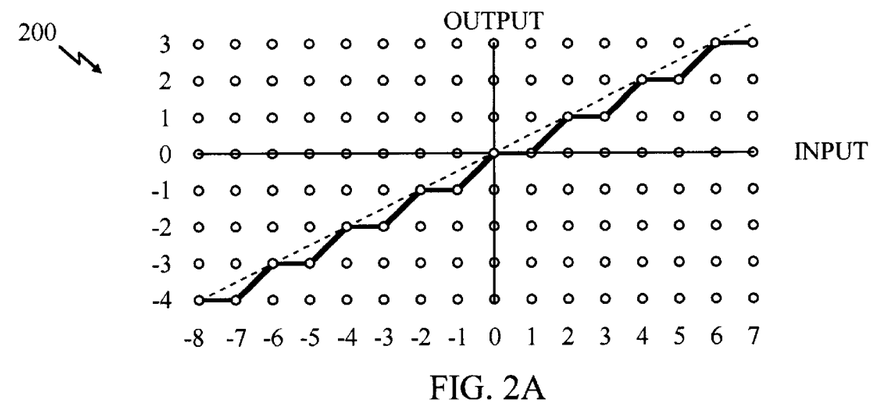
FIG. 2A is a graph illustrating the input/output relationship of conventional truncation.
Figure 2B:
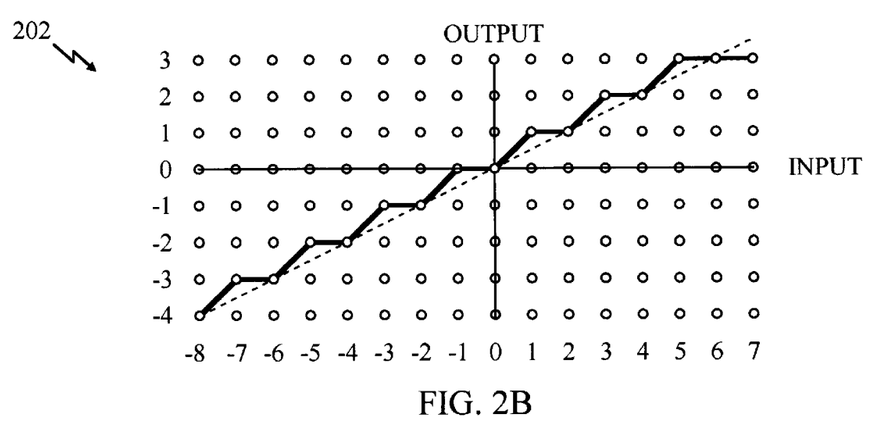
FIG. 2B is a graph illustrating the input/output relationship of conventional rounding.
Figure 2C:
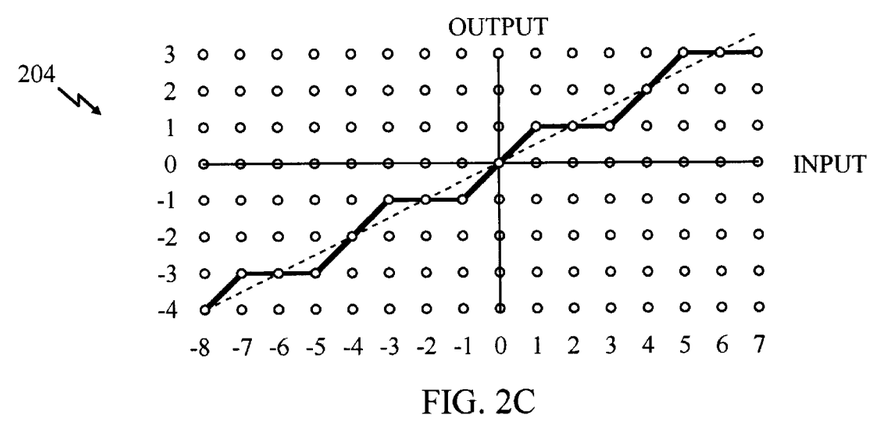
FIG. 2C is a graph illustrating the input/output relationship of dithered rounding according to the present invention.
Figure 3:
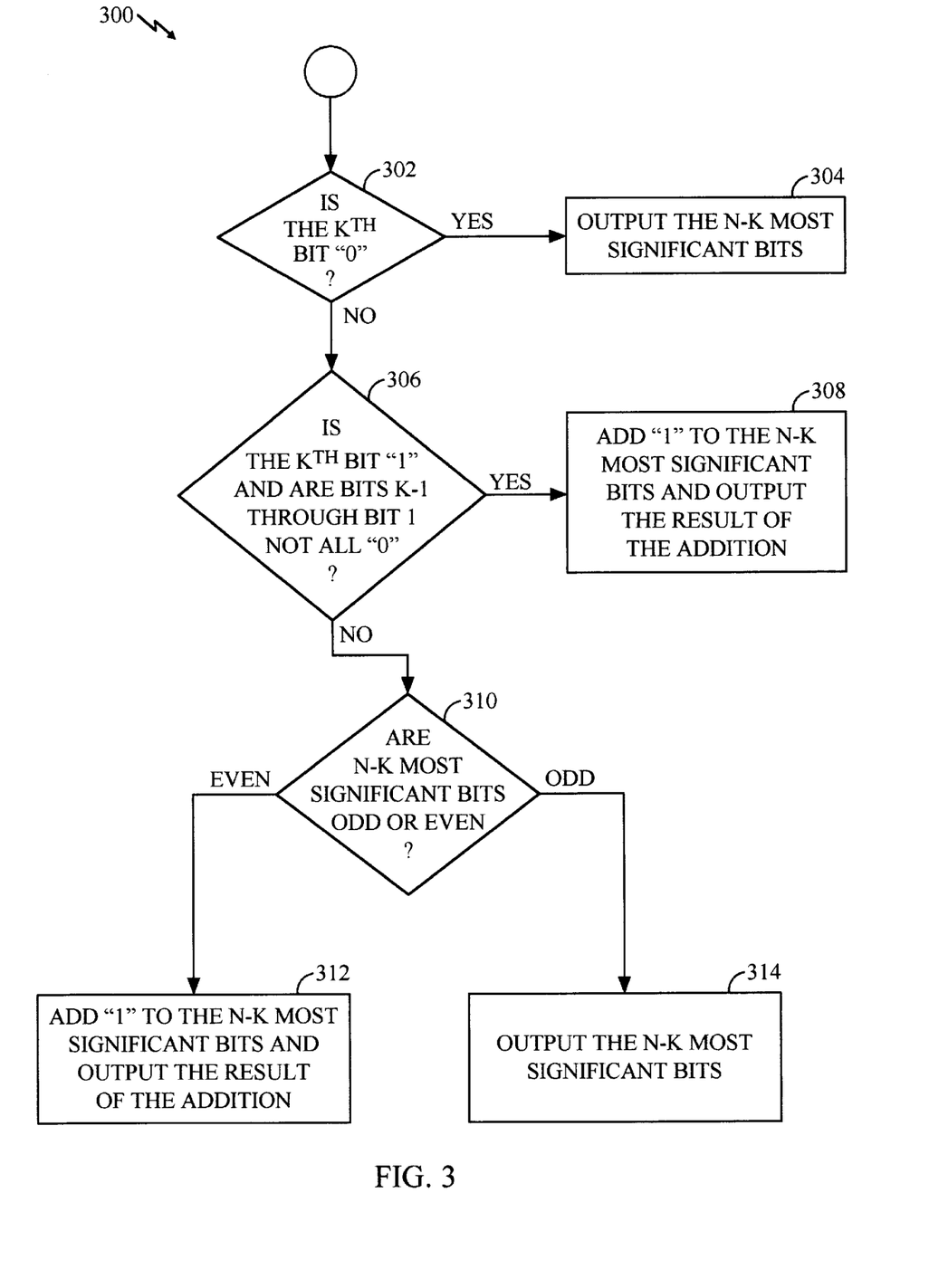
FIG. 3 is a flowchart illustrating a K-bit dithered rounding method.

This and the following sections describe a method of signal compression according to the present invention with reference to FIGS. 2 and 3. FIGS. 2A, 2B, and 2C depict the input/output relationship of three methods of one bit signal compression (as shown in graphs 200, 202, and 204). These graphs give the value output by signal compressor 106 over a given range of input values. The first two graphs (200 and 202) depict conventional signal compression methods, while the third (204) depicts a method according to the present invention. Note that both input and output values are shown in decimal format for convenience, though the values are represented in 2's complement binary format as signal input 102 and signal output 104.

The three graphs in FIG. 2 (200, 202, and 204) depict one bit compression of a four bit input signal to a three bit output signal. Those skilled in the art will recognize that one bit compression of numbers in a fixed point format reduces the available dynamic range by half. For instance, a four bit signal input 102 can represent integer signal values ranging from "7" to "–8", including "0". A three bit signal output 104 can represent integer signal values ranging from "3" to "–4", including "0". Truncation or rounding of an integer number of bits approximates the linear operation of division by a power of two. The average or expected deviation from this ideal is the bias. The linear operation of division by two is shown in graphs 200, 202, and 204 as a dotted line. However, odd input values when divided by 2 will not result in an integer output value, and, therefore, cannot be exactly represented by output signal 104. The particular signal compression method used, as described below, determines which integer output value will represent an input value under these circumstances. Note that although graphs 200, 202, and 204 depict the simple case of one bit signal compression, the following discussion is generalized to K-bit compression and those skilled in the art will recognize that the information conveyed in the three graphs can easily be extended to K-bit compression.

FIG. 2A illustrates the input/output relationship of conventional one bit truncation. As is well known to those skilled in the art, truncation refers to merely dropping the K least significant bits (the fractional component) from input signal 102 to form output signal 104. In other words, the output value is always rounded down. The solid line in FIG. 2A illustrates this relationship. For example, an input value of "5" (binary 0101) ideally compresses to a value of "2.5". Conventional truncation produces an output value of "2" (binary 010), the integer component of the input value. Those skilled in the art will recognize that since the actual output values are always equal to or less than the ideal values, conventional truncation on average introduces a negative bias to output signal 104.

FIG. 2B illustrates the input/output relationship of conventional one bit rounding. According to conventional rounding, the output value is equal to the integer nearest the ideal value, with ideal values midway between two integers (i.e., any ideal value ending in a 0.5) always being rounded up. For one bit compression, each of the odd input values is, therefore, rounded up (as shown by the solid line in FIG. 2B) as the ideal compressed value is midway between two integers. For example, an input value of "5", which ideally compresses to a value of "2.5", is rounded up to an output value of "3" since "2.5" is midway between the integers "2" and "3". The positive bias introduced by conventional rounding can be clearly seen in FIG. 2B: the actual output values are always either equal to or greater than the idea values.

FIG. 2C illustrates the input/output relationship of a method of signal compression according to the present invention, called "dithered rounding." Dithered rounding, like conventional rounding, produces an output value that is equal to the integer nearest the ideal value. However, dithered rounding operates differently on those input values that result in ideal compressed values midway between two integers. Dithered rounding strives to round approximately half of these values up, and the other half down. This dither of the rounding cancels much of the bias introduced by conventional rounding. As described above, conventional one bit rounding introduces a positive bias to output signal 104 by always rounding up for each odd input value. Dithered one bit rounding, as shown in FIG. 2C, rounds up for some odd input values ("–7", "–3", "1", and "5") and down for the others ("–5", "–1", "3", and "7"). Thus, on average, dithered rounding will introduce no bias as those input values introducing a negative bias will cancel those input values introducing a positive bias (assuming that the input values are distributed evenly across the input dynamic range).

Figure 2D:
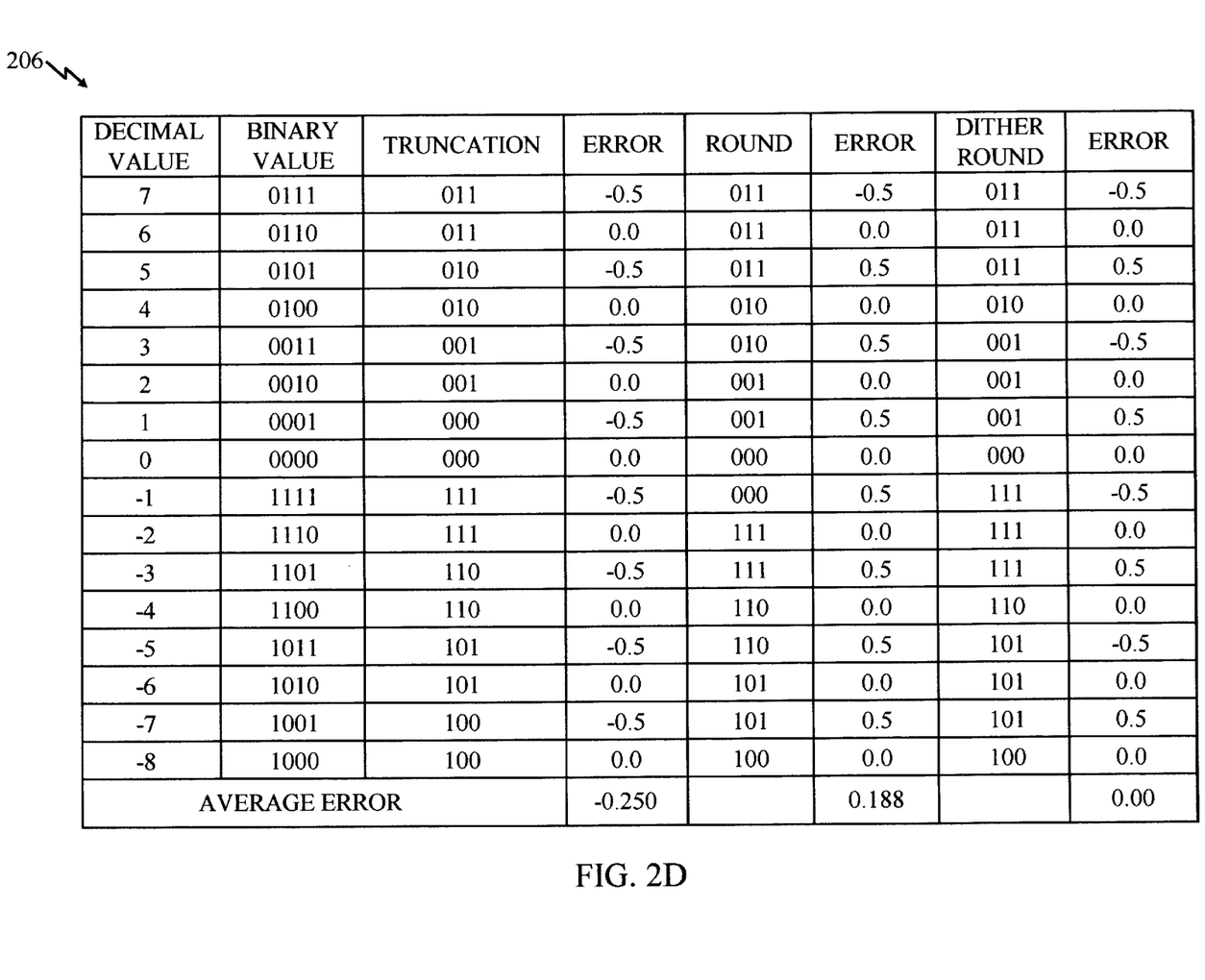
FIG. 2D is a table comparing the average error produced by one bit conventional truncation, conventional rounding, and dithered rounding.

FIG. 2D is a table 206 comparing the average error for conventional truncation, conventional rounding, and dithered rounding. Table 206 depicts the results for one bit compression of a four bit number to a three bit number. The error is calculated for each input value, and a total average error for each of the three methods. As can be seen, conventional truncation results in the highest average error, conventional rounding has the next highest average error, and dithered rounding has a zero average error.

Those skilled in the art will recognize that errors (known as "edge effects") are sometimes introduced for the most positive input values whenever 2's complement numbers are compressed. This is because, in some cases, it is not possible to represent the most positive compressed input value rounded to the next highest integer. For example, according to conventional rounding, an input value of "7" should result in an output value of "4". However, it is not possible to represent "4" using a 3 bit 2's complement format. An input value of "7" must, therefore, be represented as "3" in violation of conventional rounding rules. Those skilled in the art will recognize that edge effects can be minimized by scaling the input signal such that input values rarely reach the most positive value. However these edge effects only appear for greater than one bit compression, i.e., one bit compression does not suffer from edge effects.

The following section provides a detailed description of the dithered rounding method according to the current invention. Later sections describe various signal compressor embodiments that perform dithered rounding.

III. Dithered Rounding

FIG. 3 is a flowchart 300 depicting a dithered rounding method according to the current invention. This method compresses input signal 102 by K bits to form output signal 104 based on numerical characteristics of input signal 102. The following description assumes that input signal 102 and output signal 104 are represented in 2's complement format. Those skilled in the art will recognize that the ideas described below could be easily applied to binary numbers represented in other formats.

In step 302, the bits are checked to see if bit K of input signal 102 is "0". If bit K of input signal 102 is a "0", then processing proceeds to step 304. In step 304, the N–K most significant bits of input signal 102 are output as an N–K bit output signal 104. Input values satisfying step 302 (i.e., those values having a $K^{th}$ bit equal to "0") are those whose ideal compressed value is closest to the next lower output integer value, and are, therefore, rounded down. If bit K of input signal 102 is not a "0", then processing proceeds to step 306.

In step 306, the bits are checked to see if bit K of input signal 102 is "1". If bit K of input signal 102 is "1", and if bits 1 through K−1 are not all "0", then processing proceeds to step 308. In step 308, "1" is added to the N−K most significant bits of input signal 102 and the result is output as an N−K bit output signal 104. Input values satisfying the test for "1" is step 306 are those whose ideal compressed value is closest to the next higher output integer value, and are, therefore, rounded up.

If bit K of input signal 102 is "1", and bits 1 through K−1 are all "0", then processing proceeds to step 310. These input values are those whose ideal compressed value is midway between two integers. As described above, the dithered rounding method of the current invention strives to round approximately half of these values up, and the other half down. This is accomplished by determining whether the N−K most significant bits of input signal 102 (the integer component of input signal 102) are odd or even (i.e., whether the N−K most significant bits considered alone represent an odd or an even number), and rounding accordingly. Those skilled in the art will recognize that one half of the input values will have an odd integer component, and the other half will have an even integer component. In a preferred embodiment, those input values having an even integer component are rounded up, those having an odd integer component are rounded down.

In an alternative embodiment, this rounding convention is reversed. That is, those input values having an odd integer component are rounded up, and those having an even integer component are rounded down. Those skilled in the art will recognize that these two embodiments produce very similar results, except that the preferred embodiment, unlike the alternative embodiment, suffers no edge effects for one bit compression. Skilled artisans will also recognize that hardware considerations might dictate which embodiment is the most appropriate to implement in a given application.

The oddness/evenness of input signal 102 is preferably determined by examining bit K+1 of input signal 102. An odd integer component is indicated by "1" at bit K+1, whereas an even integer component is indicated by a "0". Those skilled in the art will recognize that oddness/evenness may be determined in other ways.

If even, then processing proceeds to step 312 where "1" is added to the N−K most significant bits of input signal 102 and the result is output as an N−K bit output signal 104. If odd, then processing proceeds to step 314 where the N−K most significant bits of input signal 102 are output as an N−K bit output signal 104. As a result, approximately half of the input values tested in step 310 are rounded up, and the other half are rounded down.

Several embodiments of signal compressor 106 using the dithered rounding method are next described. An embodiment that performs K-bit rounding is first described. Next, a less complex one bit dithered rounding embodiment is described. Those skilled in the art will recognize that the descriptions provided below apply equally well to hardware as well as software embodiments, or a combination of both. For instance, an adder may be implemented by programming a general purpose hardware device or computer to perform the required functions, or by using specialized hardware.

IV. K-Bit Dithered Rounding Embodiment

Figure 4:
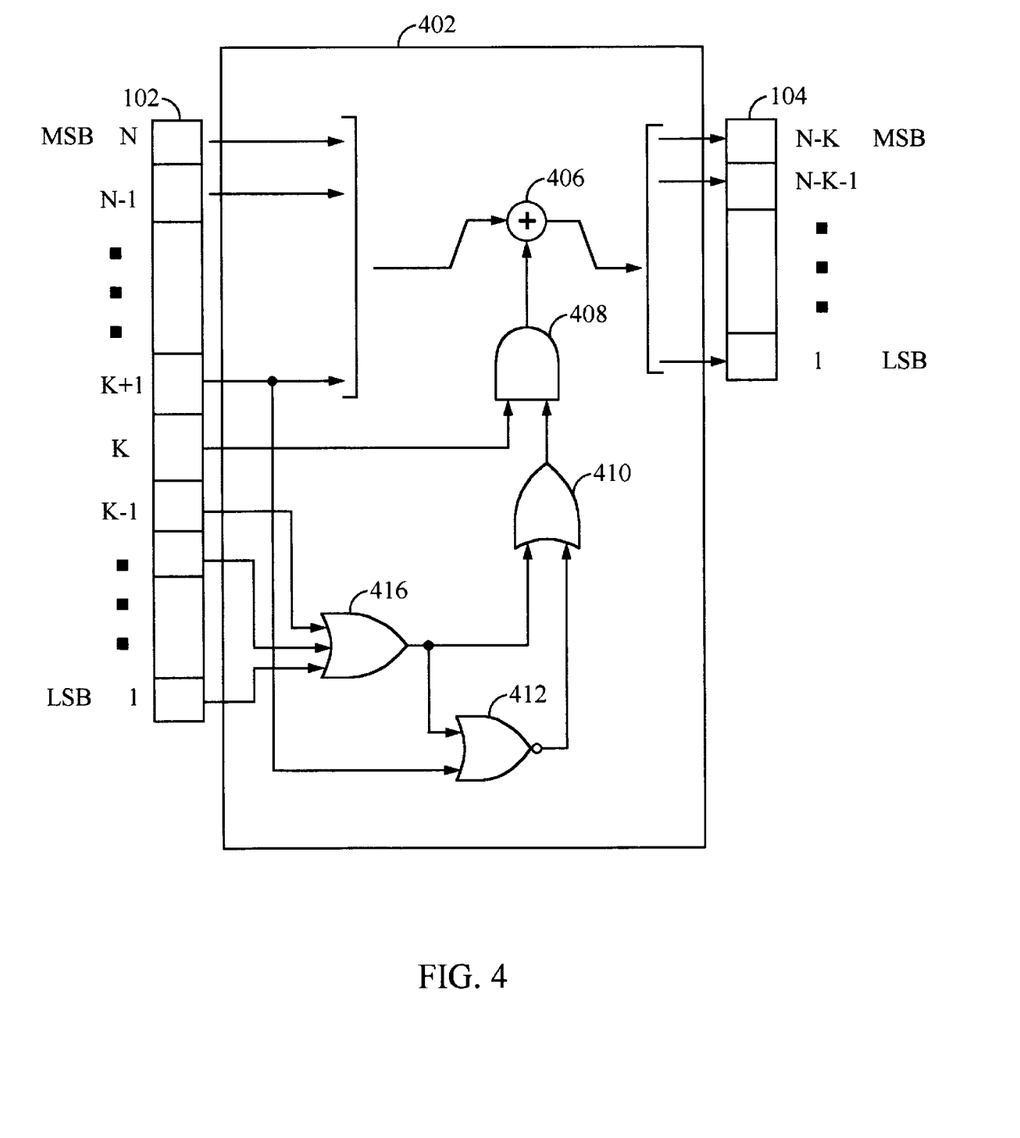
FIG. 4 is a diagram illustrating a preferred embodiment of a circuit for performing K-bit dithered rounding.

FIG. 4 depicts a K-bit dithered rounding signal compressor 402. Signal compressor 402 compresses N-bit input signal 102 by K bits, forming N−K bit output signal 104. The amount of compression K can vary from one bit to N−1 bits. Signal compressor 402 preferably includes two OR gates (410 and 416), and AND gate 408, a NOR gate 412, and an adder 406. As described above, those skilled in the art will recognize that even though the components of signal compressor 402 are described in hardware terms (e.g., gates), these functions may also be equivalently implemented in software, or a combination of hardware and software. Furthermore, those skilled in the art will recognize that alternative combinations of digital logic that perform equivalent functions or operations can be substituted for the logic described herein.

Adder 406 selectively adds "1" to the integer component of input signal 102 (i.e., the N−K most significant bits), forming N−K bit output signal 104. The remainder of the components of signal compressor 402 determine whether or not "1" is added. As described above, "1" is added for those integer components that are to be rounded up.

AND gate 408 only outputs "1" to adder 406 if both of its inputs are "1", i.e., bit K of input signal 102 and the output of OR gate 410. Thus, if bit K of input signal 102 is not "1", then the integer component of input signal 102 will not be rounded up.

OR gate 410 outputs "1" if either of its inputs are "1". Thus, one of its inputs must be "1" in order for the integer component of input signal 102 to be rounded up. OR gate 416 determines whether any of the K−1 least significant bits of input signal 102 are "1". If any of these bits are "1", then OR gate 416 outputs "1", causing OR gate 410 to output "1" as well. Alternatively, if all of the K−1 least significant bits of input signal 102 are "0", the output of OR gate 416 is "0". If bit K+1 is also "0", then the output of NOR gate 412 is "1", causing OR gate 410 to output "1".

Signal compressor 402 is a preferred embodiment for performing K-bit signal compression. The following section describes an alternative embodiment for one bit dithered rounding.

V. One Bit Dithered Rounding Embodiment

Figure 5:
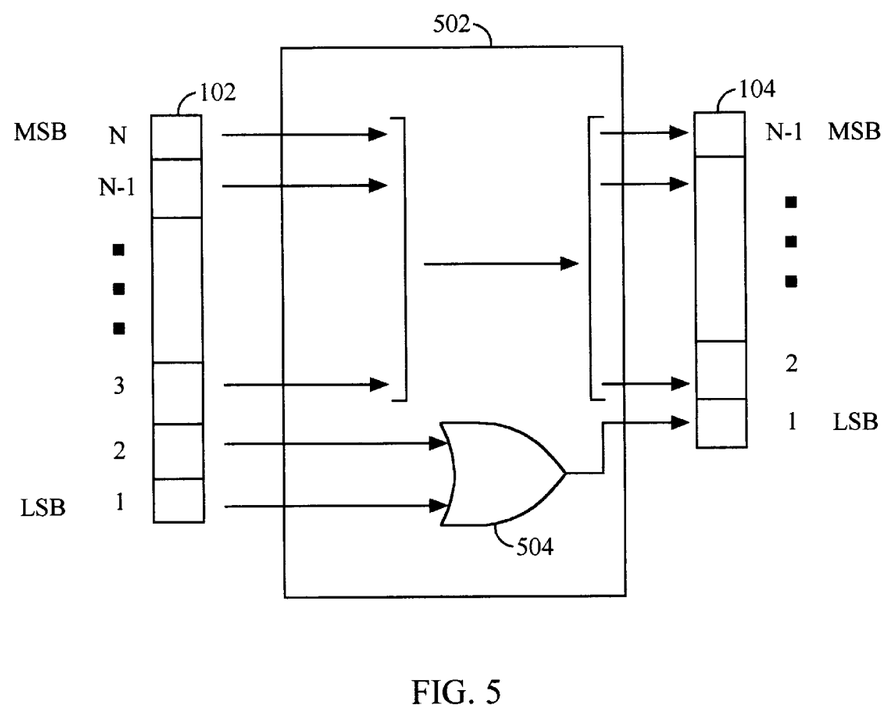
FIG. 5 is a diagram illustrating a preferred embodiment of a circuit for performing one bit dithered rounding.

FIG. 5 depicts a one bit dithered rounding signal compressor 502. Signal compressor 502 compresses N-bit input signal 102 by a single bit, forming N−1 bit output signal 104. Signal compressor 502 includes an OR gate 504. Those skilled in the art will recognize that significant savings in complexity are gained where only a single bit of compression is required. Thus, signal compressor 502 is a preferred embodiment in situations where one bit compression is required.

OR gate 504 selectively adds "1" to the integer component of input signal 102 (i.e., the N−1 most significant bits) forming N−1 bit output signal 104. OR gate 504 outputs "1" if either bit 1 or bit 2 of input signal 102 are "1". Thus, the integer component of input signal 102 is rounded up if bit 2 is "0" and bit 1 is "1".

VI. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What we claim as our invention is:

1. A method for compressing an N-bit signal by K bits, wherein the signal is represented in a 2's complement format and K<N, and wherein bit 1 of the signal is the least significant bit and bit N of the signal is the most significant bit, comprising the steps of:

outputting the N−K most significant bits of the signal if bit K of the signal is equal to "0";

adding "1" to the N−K most significant bits of the signal and outputting the result of said addition if bit K of the signal is equal to "1", and if bits K−1 through bit 1 of the signal are not all equal to "0"; and determining the oddness or evenness of the N−K most significant bits of the signal if bit K of the signal is equal to "1", and if bits K−1 through bit 1 of the signal are all equal to "0", and if even, adding "1" to the N−K most significant bits of the signal and outputting the result of said addition, and if odd, outputting the N−K most significant bits of the signal.

2. The method of claim 1, wherein said step of determining the oddness or evenness comprises examining bit K+1 of the signal, wherein the signal is odd if bit K+1 is equal to "1", and wherein the signal is even if bit K+1 is equal to "0".

3. A system for compressing an N-bit signal by K bits, wherein the signal is represented in a 2's complement format and K<N, and wherein bit 1 of the signal is the least significant bit and bit N of the signal is the most significant bit, comprising:

first means for determining whether bit K of the signal is equal to "0", and if so, outputting the N−K most significant bits of the signal;

second means for determining whether bit K of the signal is equal to "1", and if so, for determining whether bits K−1 through bit 1 of the signal are not all equal to "0", and if so, for adding "1" to the N−K most significant bits of bits of the signal and outputting the result of said addition; and third means for determining whether bit K of the signal is equal to "1", and if so, for determining whether bits K−1 through bit 1 of the signal are all equal to "0", and if so, for determining the oddness or evenness of the N−K most significant bits of the signal, and if even, for adding "1" to the N−K most significant bits of the signal and outputting the result of said addition, and if odd, for outputting the N−K most significant bits of the signal.

4. The system of claim 3, wherein said third means for determining the oddness or evenness comprises means for examining bit K+1 bit of the signal, wherein the signal is odd if bit K+1 is equal to "1", and wherein the signal is even if bit K+1 is equal to "0".

5. A system for compressing an N-bit signal by K bits, wherein the signal is represented in a 2's complement format and K<N, and wherein bit 1 of the signal is the least significant bit and bit N of the signal is the most significant bit, comprising:

first OR means for determining whether one or more of bits 1 through K−1 of the signal is equal to "1", wherein said first OR means has a first output;

first NOR means for determining whether said first output and bit K+1 of the signal are both "0", wherein said first NOR means has a second output;

second OR means for determining whether either said first output or said second output is "1", wherein said second OR means has a third output;

first AND means for determining whether said third output and bit K of the signal are both "1", wherein said first AND means has a fourth output; and an adder for adding said fourth output to the N−K most significant bits of the signal and outputting the result of said addition.

* * * * *